(No Model.)
J. M. GILMORE.
NUT LOCK.
No. 569,098. Patented Oct. 6, 1896.
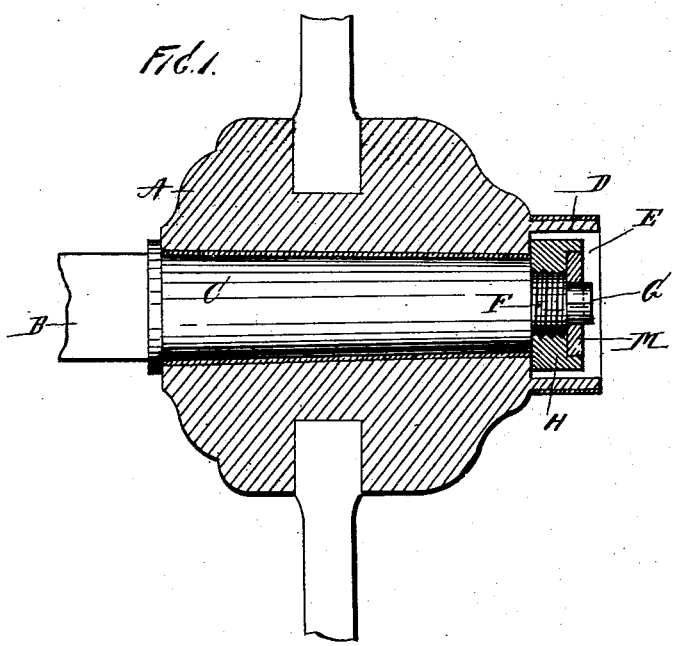
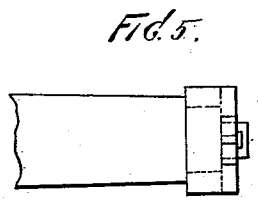
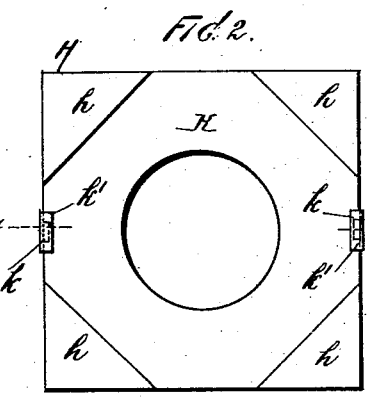
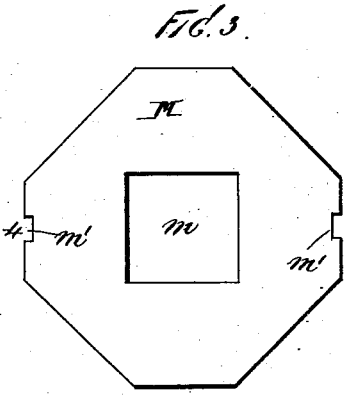
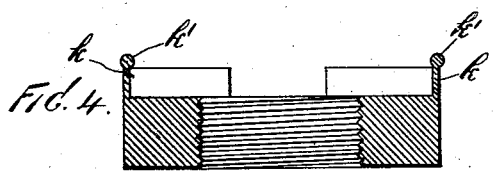
WITNESSES:
John Buckler
C. Gelst
INVENTOR
James M. Gilmore
BY
Edgar Tate & Co
ATTORNEYS.

UNITED STATES PATENT OFFICE.

JAMES MONTGOMERY GILMORE, OF NEW YORK, N. Y.

NUT-LOCK.

SPECIFICATION forming part of Letters Patent No. 569,098, dated October 6, 1896.

Application filed November 27, 1895. Serial No. 570,325. (No model.)

*To all whom it may concern:*

Be it known that I, JAMES MONTGOMERY GILMORE, a citizen of the United States, and a resident of New York city, in the county of New York and State of New York, have invented certain new and useful Improvements in Nut-Locks, of which the following is a specification, reference being had to the accompanying drawings, forming a part thereof, in which similar letters of reference indicate corresponding parts.

This invention relates to nut-locks, and particularly to that class thereof which are adapted for use in connection with buggies, carriages, carts, and other vehicles in order to secure the wheels of such vehicles in position upon the axles thereof, so as to prevent the accidental removal of the wheels from the spindles during the operation of the vehicle; and the object of the invention is to provide a simple and effective device of this class which is not only adapted for the use above set out, but which may be employed for many other and similar purposes.

The invention is fully disclosed in the following specification, of which the accompanying drawings form a part, in which—

Figure 1 is a central vertical section of the hub of a wheel, showing also the spindle of the axle on which the wheel is mounted and my improvement applied thereto; Fig. 2, a face view of a nut which I employ to hold the wheel upon the spindle; Fig. 3, a similar view of a locking-plate which is employed in connection with said nut; Fig. 4, a central section of the nut on the line 4 4 of Fig. 2, and Fig. 5 a side view of the spindle and the nut and plate in position thereon.

In the drawings forming part of this application, A represents the hub of a wheel, and B the axle, which is provided with the usual spindle C, on which the wheel is mounted, and said hub is provided with the usual extension D, in which is formed a circular chamber E. All these parts are, as will be seen, of the usual construction, and form no part of this invention.

The spindle C is provided with a screw-threaded extension F, and said screw-threaded extension F is provided with a supplemental extension G, which is square or many-sided in form, and in the practice of my invention I provide a nut or bur H, which is provided with a central screw-threaded bore which corresponds with the screw-thread on the extension F, and the nut H is cut out on its outer side or surface so as to form an octagonal space K, or said space may be formed by casting projections $h$ at each corner which are triangular in form, as shown in Fig. 2, and at each side of said nut or bur, adjacent to said octagonal space K, are projecting arms $k$, each of which is provided at its outer end with a cross-head $k'$. I also provide a plate M, which is provided with a central opening $m$, which is also square or many-sided in form, and said plate is adapted to fit upon the supplemental extension G of the spindle C or the screw-threaded extension thereof; and said plate is also adapted to fit within the octagonal space K, and the operation will be readily understood from the foregoing description when taken in connection with the accompanying drawings. The plate M is provided on its opposite sides with angular notches or recesses $m'$, and when the hub is placed in position upon the spindle the nut or bur H is secured onto the screw-threaded extension F in the usual manner, and the plate M is then placed in position upon the supplemental extension G, in which it fits within the octagonal space K of the nut H, and the arms $k$ are bent into the angular notches or recesses $m'$ of the plate M, so that the cross-heads $k'$ thereof will securely hold said plate in position.

It will be apparent that with the nut H and the plate M secured in place in the manner described the nut H cannot be removed or will not accidentally come off in the operation of the vehicle, and when it is desired to remove said nut the plate M must first be removed by bending back the arms $k$, after which said plate may be removed, as will be readily understood.

My invention is not limited to the exact form of the nut H and the plate M or to the form of the space K in the side of the nut, and many changes may be made in the construction, combination, and arrangement of parts herein described, without departing from the spirit of my invention or sacrificing its advantages. It is also evident that a nut-lock of the character herein described may be employed for other purposes than for securing the wheels of vehicles to the axles thereof, and my invention is not limited to the use thereof herein illustrated and described.

Having fully described my invention, its construction and operation, I claim as new and desire to secure by Letters Patent—

The combination with a screw-threaded bolt or shaft provided with a many-sided extension, of a nut adapted to be mounted in said screw-threaded bolt or shaft, said nut being provided in one side thereof with a many-sided cavity or space, and a plate adapted to fit within said cavity or space, and provided with a many-sided central opening, and means for holding said plate in position, consisting of side arms formed upon or secured to said nut, and provided with crossheads, said side arms being adapted to operate in connection with angular notches or recesses formed in the sides of said plate substantially as shown and described.

In testimony that I claim the foregoing as my invention I have signed my name, in presence of the subscribing witnesses, this 22d day of November, 1895.

JAMES MONTGOMERY GILMORE.

Witnesses:
WILLIAM KAVANAGH,
WILLIAM GEHRKE.